(12) United States Patent
Sharma

(10) Patent No.: US 12,502,765 B1
(45) Date of Patent: Dec. 23, 2025

(54) FLEXIBLE APPARATUS

(71) Applicant: Siemens Aktiengesellschaft, Munich (DE)

(72) Inventor: Tanyut Sharma, Karnataka (IN)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 18/925,479

(22) Filed: Oct. 24, 2024

(51) Int. Cl.
*B25J 9/06* (2006.01)
*B25J 9/00* (2006.01)
*B25J 9/10* (2006.01)

(52) U.S. Cl.
CPC ............ *B25J 9/065* (2013.01); *B25J 9/0078* (2013.01); *B25J 9/104* (2013.01)

(58) Field of Classification Search
CPC . B25J 9/0078; B25J 9/065; B25J 9/104; B25J 9/1615
See application file for complete search history.

(56) References Cited

U.S. PATENT DOCUMENTS

| | | | | |
|---|---|---|---|---|
| 11,109,925 | B2 * | 9/2021 | Cooper | A61B 34/71 |
| 11,130,244 | B2 * | 9/2021 | Jogasaki | B25J 9/104 |
| 11,400,585 | B2 * | 8/2022 | Manfredi | B25J 9/065 |

FOREIGN PATENT DOCUMENTS

| | | | | |
|---|---|---|---|---|
| CN | 114727849 | A * | 7/2022 | H01F 7/122 |
| CN | 117257464 | A * | 12/2023 | A61B 34/30 |
| CN | 118576322 | A * | 9/2024 | A61B 1/3132 |
| WO | WO-2015105421 | A1 * | 7/2015 | A61B 1/0057 |

OTHER PUBLICATIONS

Nguyen, T. D. et al. (Sep. 2015). A tendon-driven continuum robot with extensible sections. In 2015 IEEE/RSJ International Conference on Intelligent Robots and Systems (IROS) (pp. 2130-2135). IEEE.
Gravagne et al.; (2003). Large deflection dynamics and control for planar continuum robots. IEEE/ASME transactions on mechatronics, 8(2), pp. 299-307.
Wang, M. et al. (Oct. 2018). Design and development of a slender diual-structure continuum robot for in-situ aeroengine repair. In 2018 IEEE/RSJ International Conference on Intelligent Robots and Systems (IROS) (pp. 5648-5652). IEEE.

* cited by examiner

*Primary Examiner* — Bobby Rushing, Jr.
(74) *Attorney, Agent, or Firm* — Schmeiser, Olsen & Watts, LLP

(57) ABSTRACT

A flexible apparatus comprises a plurality of modules arranged sequentially along a central longitudinal axis, including a primary module at one end connected to an actuator. A biasing system with at least one biasing member between each pair of adjacent modules allows for bendable articulation and variable aspect ratio configurations. A transmission mechanism is provided, including at least one set of transmission elements linking each module from the actuator to a secondary target module where six-degree-of-freedom maneuverability is desired. Each set of transmission elements includes at least three pairs of helical strings, with each pair including a first string coiled in a clockwise direction and a second string coiled in a counterclockwise direction with respect to the central longitudinal axis. The helical strings transmit motive force from the actuator to the secondary module, enabling maneuverability of the secondary module in six degrees of freedom.

15 Claims, 5 Drawing Sheets

FLEXIBLE APPARATUS

FIELD OF TECHNOLOGY

The present disclosure relates to a flexible apparatus adapted for providing maneuverability in six degrees of freedom to a target module of multiple connected modules of the flexible apparatus.

BACKGROUND

Traditional rigid mechanisms are composed of interconnected rigid bodies that transmit motion and force through well-defined joints such as hinges, sliders, gears, and the like. These rigid mechanisms rely on precise movement of the joints to achieve desired mechanical actions. Due to their rigid construction, these mechanisms are typically characterized by high stiffness, precise control, and the ability to handle significant loads. However, they often suffer from drawbacks such as increased weight, complexity, and susceptibility to wear and tear at the joints, which can lead to maintenance issues and reduced operational lifespan.

In contrast, compliant mechanisms use elastic deformation of flexible elements to achieve force transmission and motion. These compliant mechanisms are most often comprised of a linear series of similar compliant blocks and are driven through strings that pass through the compliant blocks. Instead of relying on discrete joints, compliant mechanisms distribute deformation throughout the compliant blocks using the strings, allowing the compliant blocks to bend or twist in response to applied loads.

The implementation of compliant mechanisms results in several performance advantages over traditional rigid mechanisms. Notably, compliant mechanisms have a significantly lesser backlash due to the use of flexible materials, which enhances efficiency and maneuverability, allowing for intricate and precise movements essential in applications requiring fine control. They can also achieve higher aspect ratios, making them suitable for applications in constrained spaces, such as those commonly encountered in the domain of medical robots. Compliant mechanisms are characterized by their simpler actuation systems, needing fewer actuators and less complex controls as compared to rigid mechanisms. This reduction in complexity significantly enhances system reliability by minimizing potential points of failure. Additionally, compliant mechanisms are easier to manufacture and maintain. The use of flexible materials simplifies production, and fewer moving parts reduce mechanical wear and the need for frequent repairs. Overall, compliant mechanisms provide a robust alternative to rigid mechanisms, excelling in maneuverability, aspect ratios, and ease of manufacturing and maintenance.

FIG. 1 depicts a flexible apparatus 100 of prior art, which is a compliant mechanism. The flexible apparatus 100 includes disc-shaped modules 102 arranged sequentially and extendable along a central longitudinal axis PP'. The disc-shaped modules 102 are similar compliant blocks. The series of modules 102 includes an initial module 102A, a terminal module 102N, and intermediary modules between the initial module 102A and the terminal module 102N. The initial module 102A is connected to an actuator 104.

The prior art flexible apparatus 100 includes a central flexible backbone 106, typically cylindrical, that extends through the entire length of the modules 102. The central flexible backbone 106 passes through central through-holes of each of the intermediate modules to link the modules 102 together. The central flexible backbone 106 provides structural support while allowing necessary bending motion of the modules 102.

The prior art flexible apparatus 100 includes four straight strings 108A, 108B, 108C, 108D. These strings are connected to the actuator 104 at one end and to the terminal module 102N at the other. These strings pass through guide holes in the primary module 102A and each intermediary module. Each of the straight strings 108A, 108B, 108C, 108D is parallel to the central longitudinal axis PP' in an orientation of each of the plurality of modules 102 with their respective longitudinal axes parallel to the central longitudinal axis. These strings transmit force from the actuator 104 to the terminal module 102N through the series of compliant blocks (i.e., modules 102), facilitating motion transfer along the length of the flexible apparatus 100 via these modules. This, in turn, causes movement of the terminal module 102N and an end effector (not shown) connected to the terminal module 102N. The straight strings 108A, 108B, 108C, 108D, passing from the actuator 104 to the terminal module 102N, enable the modules 102 to bend in predictable curves upon actuation. Such an assembly, with straight and parallel strings passing through the entire length of the flexible apparatus, has been used extensively in the prior art.

Furthermore, in the prior art, three significant deviations have been investigated: (i) a manipulator having two sections, each with two degrees of freedom (DOF), a central backbone made of a continuous elastic rod and cable guides periodically spaced along its length, and four cable pairs running through guide eyelets, with two pairs terminating at the midpoint and two at the endpoint, allowing torques to be applied in orthogonal directions at the midpoint or endpoint of the backbone through differential variation of the cable tensions; (ii) a tendon-driven continuum manipulator design composed of three extensible sections, with a backbone made of three straight telescoping tubes; and a two-stage tendon-driven structure, with the first stage having ten one-degree-of-freedom sections each having a pair of cables, and the second stage having three two-degrees-of-freedom sections each having a group of three cables, resulting in a continuum robot having sixteen degrees of freedom allocated to thirteen sections.

Despite these advancements, several challenges remain. As the number of compliant blocks (or modules) increases, the aspect ratio (ratio of the length spanning the blocks to the diameter of the blocks) continues to improve. However, achieving higher aspect ratios in such a manner introduces formidable design and control challenges. These include maintaining structural integrity and stability, ensuring accurate control and coordination of the modules, and managing the increased complexity in the actuation and feedback systems necessary to operate the compliant mechanism effectively.

Furthermore, in existing compliant mechanisms, achieving full six-degree-of-freedom (6 DOF) control and maneuverability of a target module (for example, the terminal module 102N as referenced in FIG. 1) presents significant challenges. Specifically, utilizing a uniform chain of compliant blocks (modules) and four parallel strings is inadequate to provide the desired 6 DOF control. Such setup often leads to an imbalance, favoring certain directional movements over others due to the inherent limitations in the design. The primary issue arises from the parallel arrangement of the strings (for example, strings 108A, 108B, 108C, 108D as referenced in FIG. 1), which restricts the controllability of the mechanism. To achieve the desired 6 DOF control, one approach is to utilize a combination of different block designs and varied string placements. However, this approach negatively impacts several performance aspects of the compliant mechanism. The non-uniformity in block designs and cable configurations complicates the controllability, making precise movements and positioning more challenging. Further, the aspect ratio, which is crucial for maintaining a streamlined and efficient design, may be compromised due to the heterogeneous nature of the blocks. Additionally, the load-bearing capacity of the compliant mechanism may be negatively impacted, as the varying structural properties of the different blocks may lead to inconsistencies in strength and stability across the mechanism. This may require more complex control algorithms and additional structural reinforcements, making the design and operation of the compliant mechanism more complicated.

Therefore, there is a need for a flexible apparatus that addresses, overcomes, or mitigates one or more of the aforementioned challenges.

SUMMARY

Accordingly, an aspect of the present disclosure relates to a flexible apparatus that addresses, overcomes, or mitigates one or more of the aforementioned challenges encountered in prior art. The flexible apparatus is associated with a compliant mechanism. The flexible apparatus has a plurality of modules arranged in a sequence and extendable along a central longitudinal axis. The plurality of modules includes a primary module at a first end of the flexible apparatus. The primary module is connected to an actuator. The flexible apparatus has a biasing system. The biasing system has at least one biasing member connected between each pair of adjacent modules. The biasing system is adapted to enable the plurality of modules to bendably articulate relative to each other and provide a variable bias that influences the plurality of modules to assume variable aspect ratio configurations. The variable bias may be accumulated across the plurality of modules to enable the plurality of modules to assume the variable aspect ratio configurations.

The flexible apparatus further includes a transmission mechanism. The transmission mechanism includes at least one set of transmission elements connecting each module in a section extending from the actuator to a secondary module. The section includes the primary module. The secondary module is a target module at which six-degrees-of-freedom (6 DOF) control is desired. Each set of transmission elements has at least three pairs of helical strings being tensionably connected to the actuator. In the context of the present disclosure, the term "strings" shall be understood to encompass and be equivalent to "cables," "wires," and "tendons." The use of the term "strings" is intended to include all such variations and equivalents. Each pair of helical strings has a first helical string and a second helical string. The first helical string is coiled in a clockwise direction with respect to the central longitudinal axis. The second helical string is coiled in a counterclockwise direction with respect to the central longitudinal axis. The helical strings are adapted to transmit a motive force from the actuator to the secondary module, enabling maneuverability of the secondary module in six degrees of freedom.

In an embodiment, the biasing system is adapted to provide the variable bias across the plurality of modules by varying an extent of compression or expansion of the at least one biasing member connected between each pair of adjacent modules.

In an embodiment, the variable aspect ratio configurations of the plurality of modules are determined based on a maximum cross-sectional dimension of the plurality of modules and a variable length spanning the plurality of modules.

In an embodiment, the flexible apparatus includes a support element positioned between each pair of adjacent modules. In the embodiment, the biasing system has at least one first spring connecting the said support element to a first module of the corresponding pair of adjacent modules, and at least one second spring connecting the said support element to a second module of the corresponding pair of adjacent modules.

In an embodiment, peripheral dimensions of the support element positioned between each pair of adjacent modules are lesser than peripheral dimensions of the corresponding pair of adjacent modules.

In an embodiment, each of the at least one first spring and the at least one second spring between each pair of adjacent modules has a plurality of offset orthogonal springs with respective diameters progressively decreasing from the corresponding module to the corresponding support element connected to the plurality of offset orthogonal springs. As used herein, the term "offset orthogonal springs" refers to orthogonal springs whose zero-force position lies on an axis that is orthogonal to the principal plane of the orthogonal springs.

In an embodiment, between each pair of adjacent modules, a diameter of each spring of the at least one first spring progressively decreases from the first module to the support member, and a diameter of each spring of the at least one second spring progressively decreases from the second module to the support member.

In an embodiment, each of the at least one first spring and the at least one second spring includes at least one pair of offset orthogonal springs. In the embodiment, each pair of offset orthogonal springs includes springs coiled in opposite directions with respect to the central longitudinal axis.

In an embodiment, an orientation of the at least one first spring is mirrored relative to that of the at least one second spring about an orthogonal plane with respect to a longitudinal axis of the corresponding support member connected to the at least one first spring and the at least one second spring (i.e., about a plane orthogonal to the longitudinal axis of the corresponding support member), when the said corresponding support member and the said corresponding pair of adjacent modules are oriented with respective longitudinal axes parallel to the central longitudinal axis and the at least one first spring and the at least one second spring are undeformed.

In an embodiment, in each set of transmission elements, the first helical strings are positioned equidistant to one another and the second helical strings are positioned equidistant to one another. The first helical strings and the second helical strings are rotationally symmetric with respect to the central longitudinal axis when the plurality of modules of the section are oriented with respective longitudinal axes parallel to the central longitudinal axis.

In an embodiment, the first helical strings and the second helical strings of each set of transmission elements are arranged in an alternating sequence, such that the first helical strings and the second helical strings alternate along a length of the section.

In an embodiment, the transmission elements are routed through guide holes located along or proximate to outer peripheries of the primary module and one or more intermediate modules between the primary module and the secondary module of the section.

In an embodiment, for each set of transmission elements, the guide holes include first guide holes for routing the first helical strings, and second guide holes for routing the second helical strings in the section. In the embodiment, the first guide holes provided in the primary module and the one or more intermediate modules follow a clockwise helical pattern with respect to the central longitudinal axis, in an orientation of the said primary module and the one or more intermediate modules with respective longitudinal axes parallel to the central longitudinal axis. Likewise, the second guide holes provided in the primary module and the one or more intermediate modules follow a counterclockwise helical pattern with respect to the central longitudinal axis, in an orientation of the said primary module and the one or more intermediate modules with respective longitudinal axes parallel to the central longitudinal axis.

In an embodiment, in each of the primary module and the one or more intermediate modules, the first guide holes are equidistant to one another and the second guide holes are equidistant to one another. Further, the first guide holes and the second guide holes are rotationally symmetric with respect to the respective longitudinal axis of the corresponding module.

In an embodiment, the secondary module is a terminal module positioned at a second end of the flexible apparatus. The secondary module is adapted to receive the transmitted motive force along its preceding modules in the sequence.

In an embodiment, the flexible apparatus includes at least one effector connected to the secondary module. The at least one effector is communicably coupled to a control unit capable of receiving and executing commands from a user. The at least one effector is configured to perform one or more programmable tasks as commanded by the user.

Advantageously, the flexible apparatus of the present disclosure is capable of adjusting the aspect ratio while achieving precise six degrees of freedom maneuverability of the secondary module (target module), allowing it to adapt to various tasks and environments with versatility. While the transmission mechanism with helical strings provides precise 6 DOF maneuverability to the secondary module (target module), the balanced stiffness provided by the biasing system ensures that all degrees of freedom of the target module are equally usable without favoring any particular direction excessively. This enhanced flexibility and maneuverability enable the flexible apparatus to navigate through tight spaces and complex obstacles, improving operational efficiency and functionality. Unlike flexible cylindrical backbones of prior art that resist compression and axial twist disproportionately, the flexible apparatus of the present disclosure maintains balanced stiffness and offers reliable maneuverability.

Features which are described in the context of separable aspects and embodiments of the disclosure may be used together and/or be interchangeable. Similarly, features described in the context of a single embodiment may also be provided separately or in any suitable sub-combination.

The above-mentioned aspects, features, embodiments, and advantages will become more apparent and understandable with the following description of embodiments of the disclosure in conjunction with the corresponding drawings. The illustrated embodiments are intended to illustrate, but not limit the disclosure.

BRIEF DESCRIPTION

The present disclosure will be further described in reference to the drawings. It should be understood that the disclosure is not limited to the precise arrangements and instrumentalities shown and described, and is capable of variation in accordance with the scope of the appended claims and their reasonable equivalents. In the drawings, FIG. 1 is a perspective view of a prior art flexible apparatus;

Figure 1:
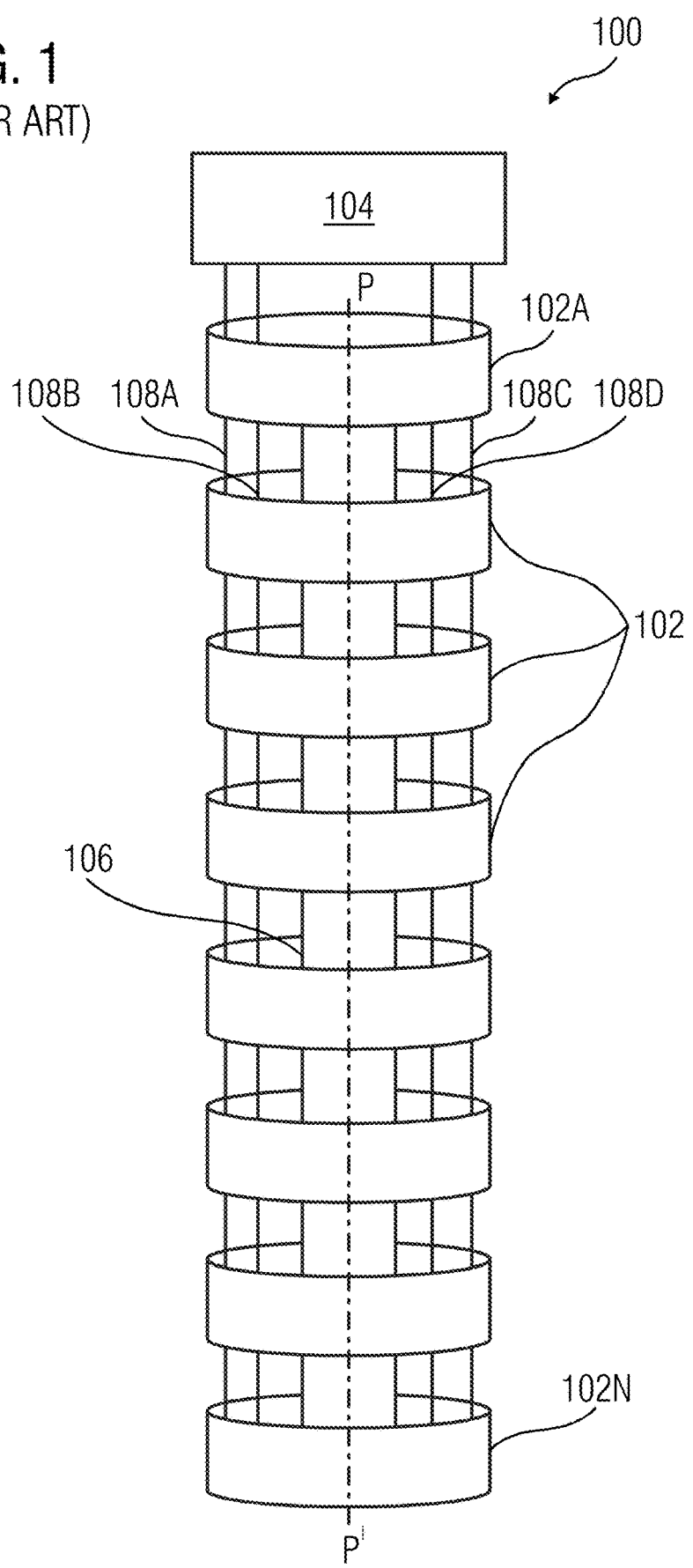

The drawings are for illustrative purposes only and may not be drawn to scale. The specific proportions of the components may vary depending on the implementation. It should be understood that like reference signs may be used to refer to the same or similar elements in different embodiments or views illustrated in the drawings.

DETAILED DESCRIPTION

Hereinafter, embodiments for carrying out the present disclosure are described in detail. The various embodiments are described with reference to the accompanying drawings, wherein like reference signs are used to refer to like elements throughout. In the following description, for the purpose of explanation, numerous specific details are set forth in order to provide a thorough understanding of one or more embodiments. It may be evident that such embodiments may be practiced without these specific details.

Figure 2A:
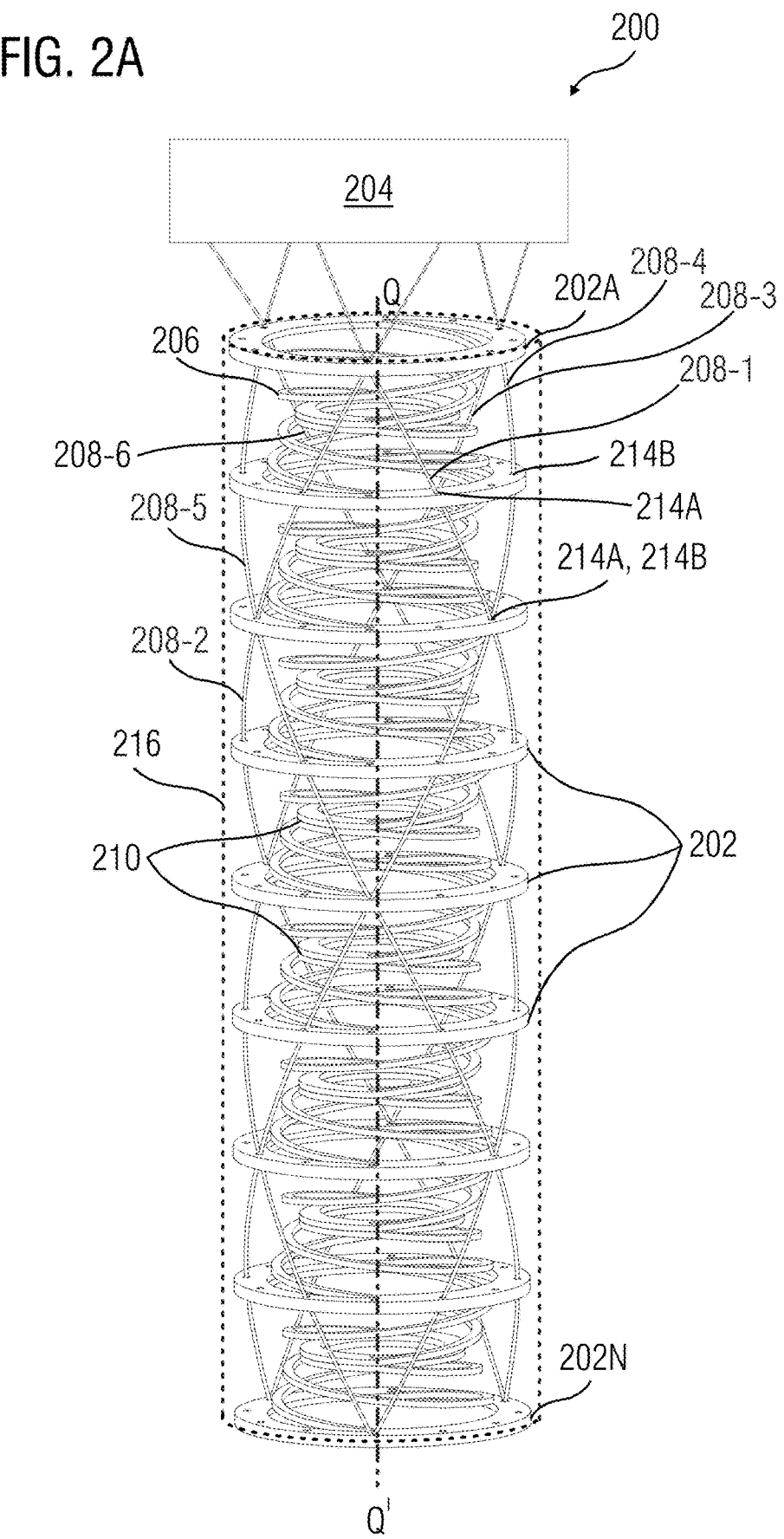
FIG. 2A is a perspective view of a flexible apparatus according to an exemplary embodiment of the present disclosure.
Figure 2B:
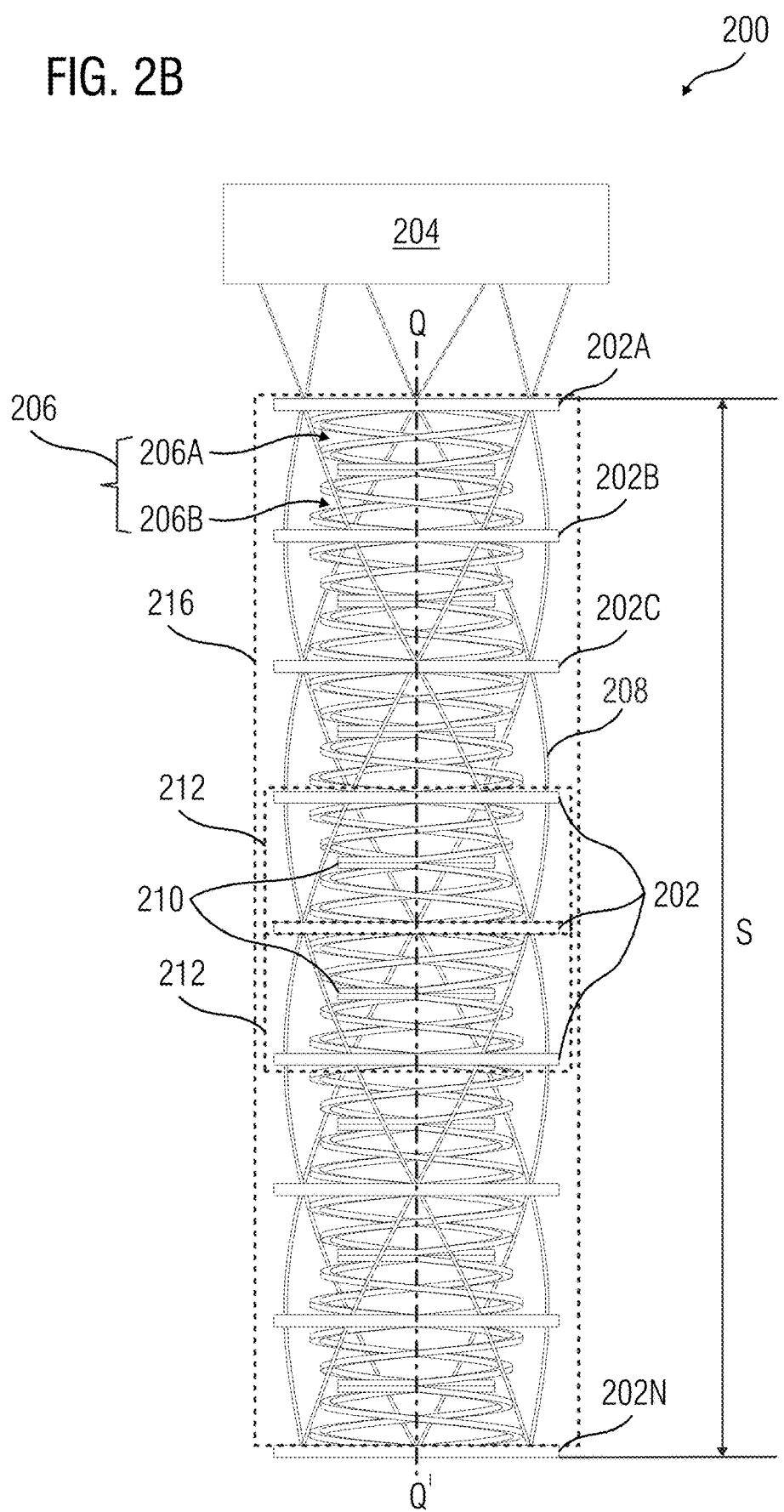
FIG. 2B is a front view of the flexible apparatus according to an exemplary embodiment of the present disclosure.

FIG. 2A and FIG. 2B respectively illustrate a perspective view and a front view of a flexible apparatus 200, in accordance with an exemplary embodiment of the present disclosure. The flexible apparatus 200 is associated with a compliant mechanism. The term "compliant mechanism" refers to a flexible structure that achieves motion through the deformation of flexible materials rather than using traditional rigid joints. The flexible apparatus 200 may find applications in, but not limited to, medical devices such as catheters, robotic systems for search and rescue operations, flexible connectors for electric vehicle charging, industrial robotics for adaptive positioning, gripping and other operations.

The flexible apparatus 200 includes a plurality of modules 202 arranged in a sequence, meaning they are connected end-to-end. The plurality of modules 202 are extendable along a central longitudinal axis Q-Q' of the flexible apparatus 200. While these modules 202 can be extended along the central longitudinal axis Q-Q', they are also capable of being positioned at various angles or configurations as needed. In a preferable embodiment, the modules 202 have the same or similar shapes and sizes. In a preferable embodiment, as illustrated, each of the plurality of modules 202 is disc-shaped with a circular cross-section. However, it should be understood that the shape and dimensions of the modules may vary in some other embodiments or implementations. The illustrated configuration is merely exemplary and should not be construed as limiting the scope of the disclosure.

The plurality of modules 202 includes a primary module 202A located at a first end of the flexible apparatus 200. The primary module 202A is an initial module among the plurality of modules 202. The primary module 202A is connected to an actuator 204 for controlling the movement and positioning of the flexible apparatus 200. The actuator 204 is a device that converts energy (often electrical, hydraulic, or pneumatic) into mechanical motion. In the context of the present disclosure, the actuator 204 serves to control the movement and positioning of the flexible apparatus 200 by extending, contracting, or adjusting the orientation of the plurality of modules 204. Across embodiments, the actuator 204 may be an electric motor converting electrical energy into rotational and/or linear motion, a hydraulic actuator using fluid pressure for linear and/or rotary motion, a pneumatic actuator utilizing compressed air for linear and/or rotary motion, or a piezoelectric actuator generating precise small-scale motion utilizing the piezoelectric effect. In another embodiment, the actuator 204 may also include a combination of one or more of the aforesaid types of actuators. The type of actuator 204 may be selected based on design considerations such as, but not limited to, the required motion of the flexible apparatus 200, load capacity, response time, precision, and environmental conditions.

The plurality of modules 202 also includes a secondary module 202N. The secondary module 202N, in this context, is a target module where maneuverability in six degrees of freedom is desired. These six degrees of freedom may encompass translational movements along the cartesian X, Y, and Z axes (not shown), as well as rotational movements around these axes (pitch, yaw, and roll). In an exemplary embodiment, as illustrated, the secondary module 202N is the last or the terminal module of the plurality of modules 202. However, in other implementations, the secondary module 202N may be located anywhere within the sequence of modules 202. Between the actuator 204 and the secondary module 202N is a section S that can be manipulated by operation of the flexible apparatus 200. The section S includes the primary module 202A and the secondary module 202N. This section S is specifically designed to be flexible and responsive to control inputs, facilitating precise adjustments and movements of the flexible apparatus 200. In an exemplary embodiment, the flexible apparatus 200 may include multiple sections or a single section. When the flexible apparatus 200 includes multiple sections, it may be noted that the primary module 202A will be the same for all the sections.

The flexible apparatus 200 has a biasing system including at least one biasing member 206 connected between each pair of adjacent modules. The biasing system is adapted to enable the plurality of modules 202 to bendably articulate relative to each other and provide a variable bias that influences the plurality of modules 202 to assume variable aspect ratio configurations. The variable bias may be accumulated across the plurality of modules to enable the plurality of modules to assume the variable aspect ratio configurations. In this context, the biasing system refers to a mechanism designed to apply a force or bias that influences the position or motion of the plurality of modules 202 of the flexible apparatus 200. The biasing system ensures that the plurality of modules 202 can bend relative to each other while maintaining a controlled configuration. Further, the at least one biasing member 206 refers to at least one component of the biasing system that provides the actual force or bias, which is connected between adjacent modules and allows the adjacent modules to move relative to each other while exerting a controlled influence on their positions. Across embodiments, the at least one biasing member 206 may correspond to, but not limited to, one or more springs, one or more elastomeric elements, one or more magnetic elements, one or more shape memory alloys, and the like. In a preferred embodiment, the at least one biasing member 206 may correspond to one or more springs, such as one or more coil springs. The one or more springs may be integrally connected to the corresponding modules. The one or more coil springs, when connected between each of the adjacent modules, allows the plurality of modules 202 to bend or articulate relative to each other while providing a variable bias. This variable bias helps the plurality of modules 202, and thus the flexible apparatus 200, to assume different aspect ratio configurations based on the applied forces and the inherent characteristics of the one or more coil springs.

The biasing system is adapted to provide the variable bias across the plurality of modules 202 by varying an extent of compression or expansion of the at least one biasing member 206 connected between each pair of adjacent modules, thereby enabling variable aspect ratio configurations. The biasing system ensures that as the at least one biasing member 206 compresses or expands, a variable force is exerted that influences the relative positions of the plurality of modules 202. Through the actuation of compression or expansion of the at least one biasing member 206, the effective length spanning the plurality of modules 202 can be varied. Thereby, the configuration of the flexible apparatus 200 can be adjusted dynamically, accommodating changes in load or other external factors while maintaining controlled articulation between the modules 202.

The variable aspect ratio configurations of the plurality of modules 202 may be determined based on a maximum cross-sectional dimension of the plurality of modules 202 and a variable length spanning the plurality of modules 202. In case of like modules 202 with circular cross-section, the maximum cross-sectional dimension is the diameter of each of the modules 202. The aspect ratio in this context may specifically refer to the ratio of the overall length spanning the plurality of modules 202 to the diameter of each of the modules 202. By extending or contracting the length of the flexible apparatus 200, the aspect ratio can be increased or decreased, respectively. In an embodiment, the diameter of each of the modules 202 is fixed, and remains constant regardless of the overall length spanning the plurality of modules 202. In the embodiment, this fixed diameter is the maximum cross-sectional dimension, providing a stable reference point for determining the aspect ratio. The flexible apparatus 200 can achieve various aspect ratio configurations to suit operational needs. For example, in scenarios where the flexible apparatus 200 needs to extend to reach distant targets or objects, increasing the length will result in a higher aspect ratio. Conversely, in situations where the flexible apparatus 200 needs to reach targets or objects that are very close, decreasing the length will result in a lower aspect ratio. This allows the flexible apparatus 200 to adapt to a wide range of tasks and environments, providing versatility and precision in its application.

Referring to FIG. 2B, in an embodiment, the flexible apparatus 200 includes a support element 210 positioned between each pair of adjacent modules. In an embodiment, the support element 210 between each pair of adjacent modules is also disc-shaped and has a circular cross-section. The support element 210 may be a rigid element, which contributes towards the structural integrity of the flexible apparatus 200. Additionally, the support element 210 serves as a mounting element for the at least one biasing member 206 of the biasing system. This configuration helps in balanced distribution of stresses in the flexible apparatus 200, and correspondingly enhances the mechanical stability and operational reliability of the flexible apparatus 200. The rigid support element 210 also facilitates efficient force transfer and load distribution between adjacent modules, leading to improved performance and durability of the flexible apparatus 200.

In an embodiment, the biasing system is configured with at least one first spring 206A connecting the support element 210 to a first module of the corresponding pair of adjacent modules, and at least one second spring 206B connecting the support element 210 to a second module of the corresponding pair of adjacent modules. The at least one first spring 206A and the at least one second spring 206B may be chained springs. The at least one first spring 206A and the at least one second spring 206B may be integrally connected to the corresponding support elements and the corresponding modules. In the illustrated embodiment, each set of components involving adjacent pair of modules 202 and one support element 210 disposed therebetween constitutes a segment 212 of the flexible apparatus 200.

Figure 3:
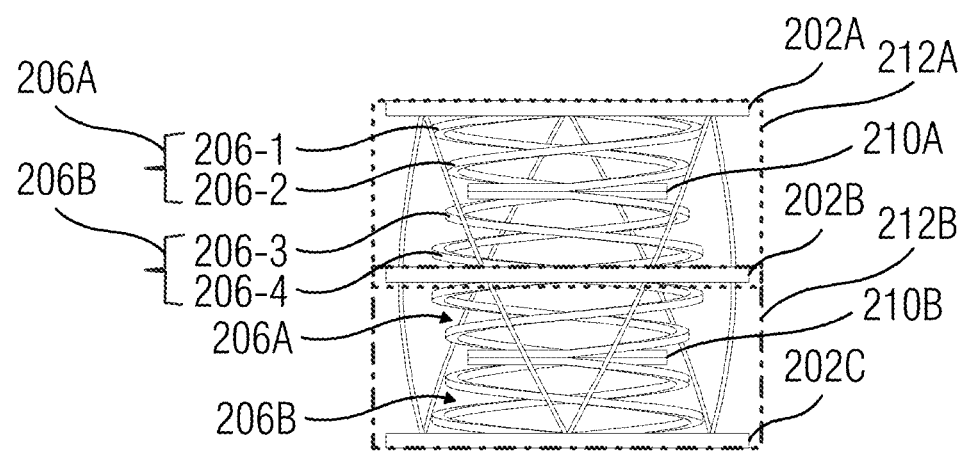
FIG. 3 is a front view of two continuous segments of the flexible apparatus according to an exemplary embodiment of the present disclosure.

FIG. 3 illustrates a front view showing two continuous segments 212 of the flexible apparatus 200, according to an exemplary embodiment of the present disclosure. Referring FIG. 3, adjacent modules 202A and 202B, along with the support element 210A, form parts of a first segment 212A. In the first segment 212A, the primary module 202A is designated as the first module and the module 202B (adjacent module to the primary module 202A) is designated as the second module within the pair of adjacent modules 202A and 202B. The at least one first spring 206A is connected between the support element 210A and the first module 202A, while the at least one second spring 206B is connected between the support element 210A and the second module 202B. The at least one first spring 206A and the at least one second spring 206B may be coil springs, for example. The at least one first spring 206A is orthogonally oriented to the support element 210A and the first module 202A, and the at least one second spring 206B is orthogonally oriented to the support element 210A and the second module 202B, when the first module 202A, the support element 210A, and the second module 202B are oriented such that their respective longitudinal axes are parallel to the central longitudinal axis QQ'. Similarly, the module 202B and the module 202C, along with the support element 210B, form parts of a second segment 212B. The second segment 212B follows the same or a similar configuration as described for the first segment 212A, including the arrangement of the biasing system involving the at least one first spring 206A and the at least one second spring 206B. This configurational similarity also holds good throughout other embodiments described later in the specification and is not repeated herein for the sake of brevity.

In an embodiment, peripheral dimensions of the support elements 210 positioned between each pair of adjacent modules are lesser than the peripheral dimensions of the corresponding pair of adjacent modules. For example, referring to the first segment 212A, a circumference of the support element 210A is smaller than that of the first module 202A and the second module 202B. In a preferred embodiment, the support elements 210 between the pairs of adjacent modules are dimensioned and positioned such that they do not extend outward beyond the peripheries of the corresponding adjacent modules, in any orientation of the plurality of modules 202. This configuration ensures that the support elements 210 allow for unobstructed movement of the plurality of modules 202 during bendable articulations of two or more of the plurality of modules 202 with respect to each other.

In a preferable embodiment, when the plurality of modules 202 are oriented with their respective longitudinal axes aligned with respect to one another, the longitudinal axes of each of the support elements 210 are also aligned with respect to the longitudinal axes of the plurality of modules 202. Referring FIG. 3, when the modules 202A, 202B, 202C are aligned with respective longitudinal axes aligned with respect to another, the longitudinal axis of the first support element 210A (of the first segment 212A) and the longitudinal axis of the second support element 210B (of the second segment 212B) are also aligned with the longitudinal axes of the modules 202A, 202B, 202B. Such an alignment ensures that the support elements 210 are precisely positioned within the structural framework of the flexible apparatus 200.

Advantageously, the support elements 210 between adjacent modules enhance the overall stability and rigidity of the flexible apparatus 200, making it beneficial for applications where the flexible apparatus 200 subject to external forces or vibrations. By distributing the load between the support member 210 and the adjacent modules, the support member 210 reduces stress on individual modules, thereby improving the durability and longevity of the flexible apparatus 210. Additionally, the support member 210 prevents excessive compression and serves as a physical barrier to avoid contact of adjacent modules. Furthermore, the at least one first spring 206A and the at least one second spring 206B offer several advantages. Spring tensions of the at least one first spring 206A and the at least one second spring 206B can be adjusted to influence the length gap between adjacent modules, providing precise control over movement and configuration of the section S. The aforementioned structural configuration involving the springs 206A, 206B and the support element 210 can also help maintain structural integrity of the flexible apparatus 200, by resisting excessive bending and twisting forces, preventing buckling, and enhancing stability, control, and safety, while reducing the need for maintenance. Advantageously, the use of support elements 210 and orthogonal springs 206A, 206B as described herein ensures that the flexible apparatus 200 can withstand various forces and maintain its shape, while also allowing for smooth and controlled expansion and compression of the modules 202 of the section S.

In an embodiment, between each pair of adjacent modules, a diameter of each spring of the at least one first spring 206A progressively decreases from the first module to the support member 210 and a diameter of each spring of the at least one second spring 206B progressively decreases from the second module to the support member 210. In an embodiment, each of the at least one first spring 206A and the at least one second spring 206B between each pair of adjacent modules includes a plurality of offset orthogonal springs with respective diameters progressively decreasing from the corresponding module to the corresponding support element connected to the plurality of offset orthogonal springs. As used herein, the term "offset orthogonal springs" refers to orthogonal springs whose zero-force position lies on an axis that is orthogonal to the principal plane of the orthogonal springs. Across embodiments, the plurality of offset orthogonal springs between each pair of adjacent modules may comprise of two springs, three springs, or four or more springs spaced apart from one another along a circumferential direction of the corresponding modules. Across embodiments, the plurality of offset orthogonal springs may have a single-spiral configuration, a double-spiral configuration, or any suitable multi-spiral configuration.

In an embodiment, the at least one first spring 206A includes first springs 206-1, 206-2, and the at least one second spring 206B includes second springs 206-3, 206-4. The diameters of the first springs 206-1, 206-2 progressively decrease from the first module 202A towards the support element 210. The diameters of the second springs 206-3, 206-4 progressively decrease from the second module 202B to the support element 210. The first springs 206-1, 206-2 are orthogonal to an orthogonal plane with respect to the longitudinal axis of the first module 202A, and the second springs 206-3, 206-4 are orthogonal to another orthogonal plane with respect to the longitudinal axis of the second module 202B of the first segment 212A.

In a further embodiment, each of the at least one first spring 206A and the at least one second spring 206B includes at least one pair of offset orthogonal springs. Each pair of offset orthogonal springs includes springs coiled in opposite directions with respect to the central longitudinal axis Q-Q'. As shown in the FIG. 3, the at least one first spring 206A includes the first springs 206-1, 206-2 which constitute one pair of offset orthogonal springs. The first springs 206-1, 206-2 are spaced apart from one another with a fixed offset between their respective mounting positions on the first module 202A of the first segment 212A. Furthermore, among the first springs 206-1, 206-2, the spring 206-1 is coiled in a first circumferential direction (counterclockwise) and the spring 206-2 is coiled in a second circumferential direction (clockwise) opposite to the first circumferential direction. Considering the central longitudinal axis Q-Q' as the reference axis, the spring 206-1 and the spring 206-2 are coiled in opposite directions with respect to the central longitudinal axis Q-Q'.

Likewise, the at least one second spring 206B includes the second springs 206-3, 206-4 which constitute another pair of offset orthogonal springs. The second springs 206-3, 206-4 are spaced apart from one another with a fixed offset between their respective mounting positions on the second module 202B of the first segment 212A. Furthermore, among the second springs 206-3, 206-4, the spring 206-3 is coiled in the first circumferential direction (counterclockwise) and the spring 206-4 is coiled in the second circumferential direction (clockwise) opposite to the first circumferential direction. Considering the central longitudinal axis Q-Q' as the reference axis, the spring 206-3 and the spring 206-4 are coiled in opposite directions with respect to the central longitudinal axis Q-Q'.

Advantageously, such a configuration of the at least one first spring 206A and the at least one second spring 206B provides balanced counteracting forces, enhancing the stability and control of the flexible apparatus 200. Opposing coil directions of the springs 206A, 206B of the biasing system as described herein helps distribute loads evenly in the structure, reducing stresses and improving durability. The offset and orthogonal arrangement of the springs 206A, 206B resists twisting and bending, maintaining structural integrity and preventing buckling. Correspondingly, the biasing system as described hereinabove ensures precise and predictable movements of the flexible apparatus 200, enhancing overall performance and reliability.

In an embodiment, an orientation of the at least one first spring 206A is mirrored relative to that of the at least one second spring 206B about an orthogonal plane with respect to a longitudinal axis of the corresponding support member 210 connected to the at least one first spring 206A and the at least one second spring 206B, when the said corresponding support member 210 and the corresponding pair of adjacent modules are oriented with respective longitudinal axes parallel to the central longitudinal axis QQ' and the at least one first spring 206A and the at least one second spring 206B are undeformed. For example, referring to the first segment 212A, the first springs 206-1, 206-2 have a mirrored orientation with respect to the second springs 206-3, 206-4 about the plane orthogonal to the longitudinal axis of the support element 210A, in an undeformed state of the first springs 206-1, 206-2 and the second springs 206-3, 206-4.

Advantageously, the mirrored arrangement involving the at least one first spring 206A and the at least one second spring 206B as described hereinabove ensures that forces applied along the longitudinal axes of the adjacent modules and the support elements are counterbalanced, minimizing asymmetric loading and reducing the potential for torsional imbalances. This configuration enhances the mechanical stability and rigidity of the flexible apparatus 200, by effectively distributing stress and strain uniformly across the at least one first spring 206A and the at least one second spring 206B between each pair of adjacent modules. Consequently, localized deformation is mitigated, and the operational lifespan of the springs 206A, 206B and the flexible apparatus 200 is improved. Further, the arrangement and configurations of the at least one first spring 206A, the at least one second spring 206B and the support element 210 between each pair of adjacent modules, as described herein, facilitate affine transformations of the flexible apparatus 200. Therefore, by ensuring consistent proportional relationships and linearity between the modules 202 of the section S during deformation, stability and functional versatility of the flexible apparatus 200 can be ensured.

Referring FIG. 2A and FIG. 2B, the flexible apparatus 200 includes a transmission mechanism. The transmission mechanism includes at least one set of transmission elements 208 connecting each module in the section S extending from the actuator 204 to the secondary module 202N. The section S includes the primary module 202A. That is, the transmission elements 208 are routed to connect each module within the section S which extends from the actuator 204 to the secondary module 202N, thereby encompassing the primary module 202A as well. The compliant nature of the transmission elements 208 accommodates the flexibility of the apparatus 200, allowing it to bend, twist, and conform to various configurations and paths while maintaining the integrity of force transmission.

Each set of transmission elements 208 includes at least three pairs of helical strings tensionably connected to the actuator 204. As used herein, the term "strings" encompasses wires, cables, tendons, flexible ropes, or any other equivalents that serve the purpose of transmitting motion and force effectively within the flexible apparatus 200. Each pair of helical strings includes a first helical string and a second helical string. The first helical string and the second helical string of each pair are coiled in opposite circumferential directions. In each pair of helical strings, the first helical string is coiled in a clockwise direction and the second helical string is coiled in a counterclockwise direction with respect to the central longitudinal axis Q-Q'. Such a coiled configuration is readily apparent in an orientation of the plurality of modules 202 with their respective longitudinal axes parallel to the central longitudinal axis Q-Q'. The core structure and function of the transmission elements 208 are based on their helical configuration, and even when bent, they retain their fundamental characteristics.

In an exemplary embodiment, as illustrated, the flexible apparatus 200 includes one set of transmission elements 208 for the section S. In the exemplary embodiment, the set of transmission elements 208 includes three pairs of helical strings. The strings 208-1, 208-2 constitute a first pair of helical strings. In the first pair of helical strings, the string 208-1 is coiled in a clockwise direction and the string 208-2 is coiled in a counterclockwise direction with respect to the central longitudinal axis Q-Q'. The strings 208-3, 208-4 constitute a second pair of helical strings. The string 208-3 is coiled in a clockwise direction and the string 208-4 is coiled in a counterclockwise direction with respect to the central longitudinal axis Q-Q'. The strings 208-5, 208-6 constitute a third pair of helical strings. The string 208-5 is coiled in a clockwise direction and the string 208-6 is coiled in a counterclockwise direction with respect to the central longitudinal axis Q-Q'. The strings 208-1, 208-3, 208-5 are the first helical strings coiled in clockwise direction and the strings 208-2, 208-4, 208-6 are the second helical strings coiled in counterclockwise direction with respect to the central longitudinal axis Q-Q'.

The helical strings 208-1, 208-2, 208-3, 208-4, 208-5, 208-6 are adapted to transmit a motive force from the actuator 204 to the secondary module 202N, enabling maneuverability of the secondary module 202N in six degrees of freedom. That is, the helical strings 208-1, 208-2, 208-3, 208-4, 208-5, 208-6 are flexible strings capable of transmitting the motive force from the actuator 204 to the modules within section S, ultimately delivering this force to the secondary module 202N. This design ensures that the motion generated by the actuator 204 is efficiently transferred through the helical strings to each module in the section S, enabling coordinated and responsive movement of the flexible apparatus 200. The flexibility and helically coiled nature of these strings allows for controlled transmission of the motive force in the section S, whilst accommodating the bending and twisting motions of the flexible apparatus 200. The biasing system and the set of transmission elements 208 thereby enable precise transmission of the motive force across the flexible apparatus 200, providing smooth and controlled movement of the secondary module 202N in six degrees of freedom without favoring any particular direction.

Further, in each set of transmission elements 208, the first helical strings 208-1, 208-3, 208-5 are positioned equidistant from one another, creating an evenly spaced arrangement. Similarly, the second helical strings 208-2, 208-4, 208-6 are also positioned equidistant from one another. Furthermore, the first helical strings 208-1, 208-3, and 208-5 and the second helical strings 208-2, 208-4, and 208-6 are arranged in a rotationally symmetric manner with respect to the central longitudinal axis Q-Q', when the plurality of modules 202 of the section S are oriented with respective longitudinal axes parallel to the central longitudinal axis Q-Q'.

Advantageously, the above-mentioned equidistant positioning and rotational symmetry of the first helical strings 208-1, 208-3, 208-5 and the second helical strings 208-2, 208-4, 208-6 ensures uniform stress distribution in the modules 202 of the section S, thereby reducing the likelihood of localized wear or failure of the modules 202 of the section S. Further, rotational symmetry of the first helical strings 208-1, 208-3, 208-5 and the second helical strings 208-2, 208-4, 208-6 with respect to the central longitudinal axis Q-Q' ensures balanced force distribution across the modules 202 of the section S. The balanced force distribution further contributes to the overall durability and longevity of the flexible apparatus 200.

In an embodiment, in each set of transmission elements 208, the first helical strings 208-1, 208-3, 208-5 and the second helical strings 208-2, 208-4, 208-6 are arranged in an alternating sequence along the length of the section S. This means that one first helical string 208-1 is followed by a second helical string 208-2, which is then followed by another first helical string 208-3, and so on. This alternating pattern is maintained consistently throughout the section S. The alternating arrangement of the first helical strings 208-1, 208-3, 208-5 and the second helical strings 208-2, 208-4, 208-6 as described herein helps to distribute mechanical loads more evenly along the length of the section S, thereby avoiding the concentration of stresses in any particular region of the modules 202 of the section S.

In an embodiment, a sheath 216 is provided for the section S, encapsulating the entire length from the primary module 202A to the secondary module 202N. The sheath 216 serves primarily as a protective barrier, safeguarding the internal components, including the modules 202 of the section S, the support elements 210 of the section S, and the transmission elements 208, from external environmental factors such as dust, moisture, and mechanical abrasion. The material of the sheath 216 can be selected based on the specific requirements of the application, ensuring optimal protection and durability. For instance, rubber can be utilized for its excellent flexibility and resistance to wear and tear, making it suitable for dynamic applications where the apparatus undergoes frequent movement. Alternatively, various types of plastics, such as polyethylene or polyvinyl chloride (PVC), can be employed for their lightweight properties, resistance to corrosion, and ease of fabrication.

Figure 4:
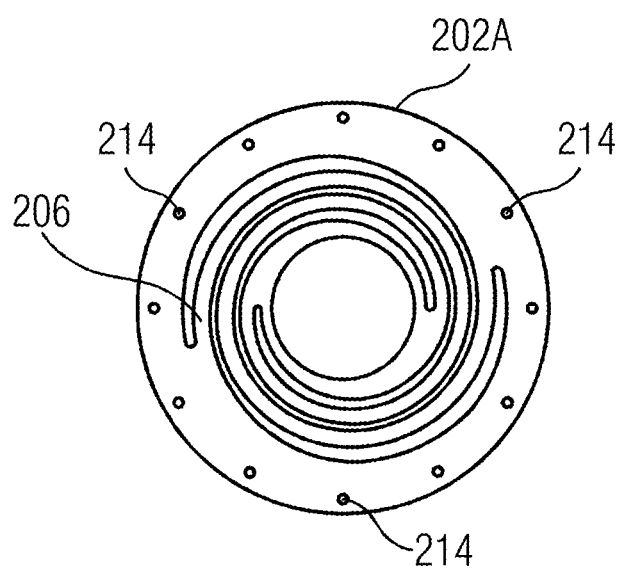
FIG. 4 is a top view of the flexible apparatus from the side of a primary module of the flexible apparatus, according to an exemplary embodiment of the present disclosure.

FIG. 4 is a top view of the flexible apparatus 200 from the side of the primary module 202A, with the actuator 204, the helical strings 208-1, 208-2, 208-3, 208-4, 208-5, 208-6 and the sheath 216 omitted, according to an exemplary embodiment of the present disclosure. Referring FIG. 4 in conjunction with FIG. 2A and FIG. 2B, in an embodiment, the transmission elements 208 are routed through guide holes 214 located along or proximate to outer peripheries of the primary module 202A and one or more intermediate modules between the primary module 202A and the secondary module 202N of the section S. As shown in FIG. 4, in an embodiment, there may exist additional holes apart from the guide holes 214 through which no helical strings are routed. In one embodiment, each of the modules 202 may be of the same type provided with twelve holes (including the guide holes 214). The guide holes 214 are preferably located beyond the peripheries of the support elements 210. These guide holes 214 are through-holes that ensure proper alignment and routing of the helical strings 208-1, 208-2, 208-3, 208-4, 208-5, 208-6, as they traverse from the actuator 204 through the primary module 202A and intermediate modules and ultimately to the secondary module 202N. The guide holes 214 reduce the likelihood of entanglement of the transmission elements 208 by constraining the path of the transmission elements 208. Reduction in the risk of entanglement of the transmission elements 208 can further contribute to smoother operation and decreased mechanical wear of the modules 202 of the section S.

In an embodiment, for each set of transmission elements 208, the guide holes 214 comprise of first guide holes 214A for routing the first helical strings 208-1, 208-3, 208-5 and second guide hole 214B for routing the second helical strings 208-2, 208-4, 208-6 in the section S. The first guide holes 214A provided in the primary module 202A and the one or more intermediate modules follow a clockwise helical pattern with respect to the central longitudinal axis Q-Q', in an orientation of the primary module 202A and the said one or more intermediate modules with respective longitudinal axes parallel to the central longitudinal axis Q-Q'. The second guide holes 214B provided in the primary module 202A and the one or more intermediate modules follow a counterclockwise helical pattern relative to the same central longitudinal axis Q-Q', in an orientation of the primary module 202A and the said one or more intermediate modules with respective longitudinal axes parallel to the central longitudinal axis Q-Q'. It may be noted that in some modules 202, the first guide holes 214A may coincide with the second guide holes 214B. As depicted in FIG. 2A, in an embodiment, on the primary module 202A, the first guide holes 214A and the second guide holes 214B coincide with one another. However, on the module immediately adjacent to the primary module 202A (i.e. module 202B), the first guide holes 214A and the second guide holes 214B are distinct and do not coincide. This alternating pattern continues throughout the modules 202, with the first guide holes 214A and the second guide holes 214B coinciding in one module and being spaced apart from one another in the next. This alternating pattern is owed to the helical arrangement pattern of the first guide holes 214A and the second guide holes 214B as described hereinabove. The routing of the first helical strings 208-1, 208-3, 208-5 through the first guide holes 214A and the routing of the second helical strings 208-2, 208-4, 208-6 through the second guide holes 214B as described herein can help mitigate torsional imbalances associated with the modules 202 of the section S, reducing the risk of stress concentrations and potential points of failure in the flexible apparatus 200.

In an embodiment, in each of the primary module 202A and the one or more intermediate modules (see FIG. 2A and FIG. 2B) between the primary module 202A and the secondary module 202N, the first guide holes 214 are equidistant to one another and the second guide holes 214B are equidistant to one another. Further, the first guide holes 214A and the second guide holes 214B are rotationally symmetric with respect to the corresponding longitudinal axis of the corresponding module of the section S. Advantageously, the rotational symmetry and consistent spacing of the first guide holes 214A and the second guide holes 214B can help simplify the manufacturing and assembly processes of the modules 202. Furthermore, it allows for precise alignment and routing of the first helical strings 208-1, 208-3, 208-5 and the second helical strings 208-2, 208-4, 208-6 in the flexible apparatus 200. This precision not only improves the reliability and performance of the flexible apparatus 200, but also reduces the likelihood of installation errors and maintenance issues, ultimately extending the operational lifespan of the flexible apparatus 200.

Referring back to FIG. 3, the first helical strings 208-1, 208-3, 208-5 (clockwise helical strings) and the second helical strings 208-2, 208-4, 208-6 (anticlockwise helical strings) ensure that kinematics of the two continuous segments 212A and 212B would nearly mimic that of a Stewart platform, thereby ensuring excellent controllability and precise maneuverability. However, it is recognized that a Stewart platform inherently possesses a limited range of motion due to its structural constraints. The flexible apparatus 200 of the present disclosure addresses this limitation by retaining the controllability characteristic of the Stewart platform while significantly enhancing the operational range. This is achieved when multiple such segments 212 in series are employed. The integration of multiple segments 212 allows for an extended range of motion and flexibility, providing a significant advantage over traditional Stewart platforms. The implementation of affine transformations using the springs 206A, 206B as described herein enables exceptionally long and controllable configurations of the flexible apparatus 200, thereby extending the operational capabilities of the flexible apparatus 200. In some embodiments, at least one biasing member 206 includes the springs 206A, 206B which are strategically positioned to provide optimal biasing forces, ensuring that the segments 212 maintain their structural integrity and controllability.

The six degrees of freedom (6 DOF) maneuverability of the secondary module 202N of the section S is achieved through the coordinated tensioning and relaxation of the helical strings 208-1, 208-2, 208-3, 208-4, 208-5, 208-6 connected to the actuator 204. For translational movements of the secondary module 202N along cartesian coordinate axes (not shown), the actuator 204 provides equal length to adjacent pairs of helical strings. For rotational movements of the secondary module 202N, opposing lengths may be provided to adjacent helical strings which induces the desired rotations about the cartesian axes. By precisely controlling the tension in the helical strings 208-1, 208-2, 208-3, 208-4, 208-5, 208-6, the actuator 204 can induce complex, multi-axis movements of the secondary module 202N, enabling the secondary module 202N to achieve maneuverability in six degrees of freedom.

In an embodiment, as depicted, the secondary module 202N is the terminal module positioned at a second end of the flexible apparatus 200. In the embodiment, this secondary module 202N is adapted to receive the transmitted motive force along its preceding modules in the sequence. However, the secondary module in other embodiments may not be the terminal module. Instead, it may be any module positioned between the primary module and the terminal module where maneuverability in six degrees of freedom (6 DOF) is required. This flexibility in design allows for more versatile applications, where any module between the initial module and the terminal module can also achieve independent and precise control in six degrees of freedom.

In an embodiment, the flexible apparatus 200 includes at least one effector (not shown) connected to the secondary module 202N. The effector may be an end effector, in an embodiment where the secondary module 202N is the terminal module of the flexible apparatus 200. Since the secondary module 202N can move in six degrees of freedom, the at least one effector attached to it can also move in the same six degrees of freedom. The at least one effector is communicably coupled to a control unit (not shown) capable of receiving and executing commands from a user (not shown). This configuration allows the effector to perform one or more programmable tasks as commanded by the user. The control unit serves as the interface between the user and the effector, translating user inputs into precise actions executed by the effector. This setup ensures that the effector can carry out a variety of tasks with high accuracy and responsiveness, adapting to different operational requirements and user specifications. The tasks can be for example, but not limited to, precision gripping, pick-and-place operations, cutting, engraving, etching, welding, painting, assembly, inspection, medical procedures such as tissue manipulation and drug delivery, etc. The tasks can be adapted based on the environment of use and the implementation of the flexible apparatus 200.

One modification to the illustrated design of the flexible apparatus 200 involves dividing the flexible apparatus 200 into multiple sections, with each section provided with at least three pairs of helical strings (for example, a total of six strings per section). This configuration would allow full 6 DOF control of the desired target modules—each kinematically similar to the secondary module 202N as illustrated and described in the preceding embodiments of the flexible apparatus—without affecting the terminal module. This modular approach enhances the overall functionality and adaptability of the flexible apparatus, making it suitable for a wide range of applications where precise control of multiple sections is crucial. A person having ordinary skill in the art may implement numerous modifications and variations without departing from the scope and spirit of the present disclosure.

Advantageously, the flexible apparatus of the present disclosure is capable of adjusting the aspect ratio while achieving precise maneuverability of the secondary module (target module) in six degrees of freedom, allowing it to adapt to various tasks and environments with versatility. The transmission mechanism, which incorporates helical strings, facilitates precise 6 DOF control of the secondary module (target module), ensuring that the secondary module (target module) can be maneuvered with high accuracy and responsiveness. The balanced stiffness provided by the biasing system is a critical feature, as it ensures that all degrees of freedom of the target module are equally usable without favoring any particular direction, thus maintaining uniform operational capability across six degrees of freedom. This enhanced flexibility and maneuverability enable the flexible apparatus to navigate through tight spaces and complex obstacles, thereby improving its operational efficiency and functionality. Unlike flexible cylindrical backbones of prior art that resist compression and axial twist disproportionately, the flexible apparatus of the present disclosure maintains balanced stiffness and offers reliable maneuverability. This ensures that the flexible apparatus can perform effectively in a variety of environments, thereby enhancing its applicability and utility in diverse operational scenarios. The flexible apparatus of the present disclosure thus addresses and overcomes significant limitations observed in prior art, providing a robust solution that combines adaptability with precision control.

The flexible apparatus of the present disclosure finds numerous applications across diverse fields. In the realm of industrial automation, particularly on manufacturing and assembly lines, the flexible apparatus can significantly enhance the efficiency and precision of tasks, for example, spray painting an automobile body in a sealed chamber. The 6 DOF control ensures precise motion of the end effector, which in this case is the spray gun, while the ability to adjust the aspect ratio allows for optimal positioning of the spray gun. This eliminates the need for multiple spray guns positioned along the length of the manipulator to access different parts of the automobile body. Instead, the aspect ratio control provides better access to areas closer to the inner wall of the chamber, ensuring comprehensive coverage and a high-quality finish. This capability not only streamlines the spray-painting process but also reduces equipment costs and setup times, thereby improving overall operational efficiency.

In medical applications, the flexible apparatus can be implemented in processes requiring high precision and control, such as minimally invasive surgery and drug delivery. Further, the step-by-step retraction capability of a catheter, enabled by the biasing system of the flexible apparatus, allows for controlled and precise positioning. This enhanced procedural accuracy ensures that the target site is reached accurately, thereby improving the effectiveness of the medical intervention. The balanced stiffness and flexibility adjustments provided by the biasing system contribute to stability during delicate operations, minimizing the risk of unintended movements and potential complications.

The flexible apparatus may also find application in search and rescue operations, for example, searching for and reaching an individual trapped in difficult terrains or confined spaces. The 6 DOF control allows the target module and the end effector to navigate through debris and obstacles to reach the trapped individual. Once contact is made, the ability of the flexible module to reduce its aspect ratio enhances its stability, providing a secure means of grasping and extracting the individual. However, appropriate control is essential to balance maneuverability and operational effectiveness, based on the environment.

For inspection and maintenance tasks in hazardous areas such as boiler tanks, application of the flexible apparatus of the present disclosure offers a safer and more efficient alternative to manual inspections. The 6 DOF control allows the end effector to navigate through tight and potentially dangerous spaces, while the adjustable aspect ratio ensures that the apparatus can reach and inspect various parts of the tank comprehensively. This reduces the need for human entry into hazardous environments, thereby minimizing risks and improving safety.

In the context of electric vehicle (EV) charging, the flexible apparatus can be employed to position charging connectors precisely, regardless of the vehicle's orientation. The ability of the flexible apparatus to adjust its aspect ratio ensures that the charging connector can be positioned correctly even in confined spaces or when the vehicle is parked at an angle. This enhances the convenience and efficiency of EV charging processes, making them more user-friendly and reliable.

It should be noted that the applications mentioned hereinabove are not limiting but exemplary. The flexible apparatus of the present disclosure is capable of being adapted for a wide range of other uses and applications without departing from the scope and spirit of the disclosure. A person skilled in the art may readily envision various modifications and alterations to the disclosed embodiments to suit different operational requirements and environments.

Overall, the flexible apparatus of the present disclosure offers a robust solution that combines adaptability with precision control, making it suitable for a wide range of applications. The flexible apparatus of the present disclosure addresses significant challenges observed in prior art, providing enhanced functionality, operational efficiency, and safety across various fields.

While the present disclosure has been described in detail with reference to certain embodiments, it should be appreciated that the present disclosure is not limited to those embodiments. The foregoing examples have been provided merely for the purpose of explanation and are in no way to be construed as limiting of the present disclosure disclosed herein. Those skilled in the art, having the benefit of the teachings of this specification, may effect numerous modifications thereto and changes may be made without departing from the scope of the disclosure in its aspects.

What is claimed is:

1. A flexible apparatus, comprising:
   a plurality of modules arranged in a sequence and extendable along a central longitudinal axis, wherein the plurality of modules comprises a primary module at a first end of the flexible apparatus, the primary module being connected to an actuator;
   a biasing system comprising at least one biasing member connected between each pair of adjacent modules, the biasing system being adapted to enable the plurality of modules to bendably articulate relative to each other and provide a variable bias that influences the plurality of modules to assume variable aspect ratio configurations;

a transmission mechanism comprising at least one set of transmission elements connecting each module in a section extending from the actuator to a secondary module, the section including the primary module, wherein each set of transmission elements comprises at least three pairs of helical strings being tensionably connected to the actuator, with each pair of helical strings comprising a first helical string and a second helical string, the said first helical string being coiled in a clockwise direction and the said second helical string being coiled in a counterclockwise direction with respect to the central longitudinal axis, and the said helical strings being adapted to transmit a motive force from the actuator to the secondary module, enabling maneuverability of the secondary module in six degrees of freedom; and a support element positioned between each pair of adjacent modules;

wherein the biasing system includes at least one first spring connecting the support element to a first module of a corresponding pair of adjacent modules and at least one second spring connecting the support element to a second module of the corresponding pair of adjacent modules.

2. The flexible apparatus according to claim 1, wherein the biasing system is adapted to provide the variable bias across the plurality of modules by varying an extent of compression or expansion of the at least one biasing member connected between each pair of adjacent modules.

3. The flexible apparatus according to claim 1, wherein the variable aspect ratio configurations of the plurality of modules are determined based on a maximum cross-sectional dimension of the plurality of modules and a variable length spanning the plurality of modules.

4. The flexible apparatus according to claim 1, wherein peripheral dimensions of the support element positioned between each pair of adjacent modules are lesser than peripheral dimensions of the corresponding pair of adjacent modules.

5. The flexible apparatus according to claim 1, wherein each of the at least one first spring and the at least one second spring between each pair of adjacent modules comprises a plurality of offset orthogonal springs with respective diameters progressively decreasing from the corresponding module to the corresponding support element connected thereto.

6. The flexible apparatus according to claim 5, each of the at least one first spring and the at least one second spring comprises at least one pair of offset orthogonal springs, and wherein each pair of offset orthogonal springs comprises springs coiled in opposite directions with respect to the central longitudinal axis.

7. The flexible apparatus according to claim 1, wherein between each pair of adjacent modules, a diameter of each spring of the at least one first spring progressively decreases from the first module to the support member and a diameter of each spring of the at least one second spring progressively decreases from the second module to the support member.

8. The flexible apparatus according to claim 1, wherein an orientation of the at least one first spring is mirrored relative to that of the at least one second spring about an orthogonal plane with respect to a longitudinal axis of the corresponding support member connected thereto, when the said corresponding support member and the corresponding pair of adjacent modules are oriented with respective longitudinal axes parallel to the central longitudinal axis and the at least one first spring and the at least one second spring are undeformed.

9. The flexible apparatus according to claim 1, wherein in each set of transmission elements, the first helical strings are positioned equidistant to one another and the second helical strings are positioned equidistant to one another, and wherein the first helical strings and the second helical strings are rotationally symmetric with respect to the central longitudinal axis when the plurality of modules of the section are oriented with respective longitudinal axes parallel to the central longitudinal axis.

10. The flexible apparatus according to claim 1, wherein the first helical strings and the second helical strings of each set of transmission elements are arranged in an alternating sequence, such that the first helical strings and the second helical strings alternate along a length of the section.

11. The flexible apparatus according to claim 1, wherein the transmission elements are routed through guide holes located along or proximate to outer peripheries of the primary module and one or more intermediate modules between the primary module and the secondary module of the section.

12. The flexible apparatus according to claim 11, wherein for each set of transmission elements, the guide holes comprise of first guide holes for routing the first helical strings and second guide holes for routing the second helical strings in the section, and wherein, the first guide holes provided in the primary module and the one or more intermediate modules follow a clockwise helical pattern and the second guide holes provided in the primary module and the one or more intermediate modules follow a counterclockwise helical pattern with respect to the central longitudinal axis, in an orientation of the said primary module and the said one or more intermediate modules with respective longitudinal axes parallel to the central longitudinal axis.

13. The flexible apparatus according to claim 12, wherein in each of the primary module and the one or more intermediate modules, the first guide holes are equidistant to one another and the second guide holes are equidistant to one another, and the first guide holes and the second guide holes are rotationally symmetric with respect to the respective longitudinal axis of the corresponding module.

14. The flexible apparatus according to claim 1, wherein the secondary module is a terminal module positioned at a second end of the flexible apparatus, adapted to receive the transmitted motive force along its preceding modules in the sequence.

15. The flexible apparatus according to claim 1, comprising at least one effector connected to the secondary module, wherein the at least one effector is communicably coupled to a control unit capable of receiving and executing commands from a user, the at least one effector being configured to perform one or more programmable tasks as commanded by the user.

* * * * *